(12) United States Patent
Kokubun et al.

(10) Patent No.: US 7,609,042 B2
(45) Date of Patent: Oct. 27, 2009

(54) CONTROLLER FOR DC-DC CONVERTER AND METHOD FOR CONTROLLING DC-DC CONVERTER

(75) Inventors: Masatoshi Kokubun, Kasugai (JP); Katsuyuki Yasukouti, Kasugai (JP); Takashi Matsumoto, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 43 days.

(21) Appl. No.: 11/390,260

(22) Filed: Mar. 28, 2006

(65) Prior Publication Data

US 2007/0069703 A1 Mar. 29, 2007

(30) Foreign Application Priority Data

Sep. 29, 2005 (JP) ............................. 2005-284307

(51) Int. Cl.
 *G05F 1/40* (2006.01)
(52) U.S. Cl. ...................................... 323/284; 323/274
(58) Field of Classification Search ................. 323/225, 323/226, 270, 271, 274, 280, 284, 351
See application file for complete search history.

(56) References Cited

U.S. PATENT DOCUMENTS

| | | | | |
|---|---|---|---|---|
| 5,414,341 A * | 5/1995 | Brown | ........................ | 323/268 |
| 5,773,966 A * | 6/1998 | Steigerwald | ................. | 323/284 |
| 5,781,000 A * | 7/1998 | Saeki et al. | ................. | 323/234 |
| 5,912,552 A * | 6/1999 | Tateishi | ...................... | 323/285 |
| 6,404,076 B1 * | 6/2002 | Matsuda et al. | ................ | 307/80 |
| 6,430,070 B1 * | 8/2002 | Shi et al. | ........................ | 363/97 |
| 6,441,591 B2 * | 8/2002 | Nokkonen | .................... | 323/266 |
| 6,611,132 B2 * | 8/2003 | Nakagawa et al. | ........... | 323/284 |
| 6,664,772 B2 * | 12/2003 | Saeki et al. | ................... | 323/273 |
| 6,724,174 B1 * | 4/2004 | Esteves et al. | ............... | 323/224 |
| 7,064,531 B1 * | 6/2006 | Zinn | .......................... | 323/268 |
| 7,180,274 B2 * | 2/2007 | Chen et al. | ................... | 323/222 |
| 7,248,030 B2 * | 7/2007 | Yoshino | ...................... | 323/284 |

FOREIGN PATENT DOCUMENTS

CN 1341877 A 3/2002
JP 2003-9515 A 1/2003

OTHER PUBLICATIONS

Chinese Office Action dated May 9, 2008, 29 pages.

* cited by examiner

*Primary Examiner*—Jessica Han
*Assistant Examiner*—Emily Pham
(74) *Attorney, Agent, or Firm*—Arent Fox LLP

(57) ABSTRACT

A DC-DC converter that suppresses increase in area and obtains high conversion efficiency irrespective of the output current. A controller controls a first output transistor and a second output transistor in a PWM operation mode or a linear operation mode based on output voltage of the DC-DC converter. The controller operates the DC-DC converter as a switching regulator that activates and inactivates the first output transistor and the second output transistor in a complementary manner during the PWM operation mode. The controller operates the DC-DC converter as a linear regulator that inactivates the second output transistor and controls the ON-resistance value of the first output transistor to perform linear operation with the first output transistor during the linear operation mode.

20 Claims, 6 Drawing Sheets

CONTROLLER FOR DC-DC CONVERTER AND METHOD FOR CONTROLLING DC-DC CONVERTER

CROSS-REFERENCE TO RELATED APPLICATIONS

This application is based upon and claims the benefit of priority from the prior Japanese Patent Application No. 2005-284307, filed on Sep. 29, 2005, the entire contents of which are incorporated herein by reference.

BACKGROUND OF THE INVENTION

The present invention relates to a DC-DC converter, and more particularly, to a controller for a DC-DC converter and a method for controlling the DC-DC converter.

Portable electronic devices are recently being widely used. The portable devices use a battery for a drive power supply. Since the output voltage of the battery decreases through use of the device or through discharge, the electronic device includes a direct current voltage converting circuit (DC-DC converter) for converting the voltage of the battery to a constant voltage. The conversion efficiency of the DC-DC converter affects the operation time of the electronic device, which is operated by the battery. Since the electronic device requires different amounts of current depending on the operation at a given time, there is a demand for a DC-DC converter and controller for a DC-DC converter having satisfactory conversion efficiency irrespective of the change in current amount.

In the prior art, a portable electronic device uses a switching type DC-DC converter (hereinafter referred to as a switching regulator) that is compact and has satisfactory conversion efficiency. The switching regulator is a pulse width modulation (PWM) type regulator that keeps the output voltage substantially constant by controlling the pulse width of a pulse signal, which drives a main switching transistor according to the output voltage or the output current.

An electronic device operated by a battery may at times suppress the consumption current to prolong the life of the battery and extend the operation time of the electronic device. However, in such a low load state, the voltage conversion efficiency is extremely low in a PWM type switching regulator. This is due to the following reasons.

The power loss of the switching regulator includes loss that depends on the output current of the switching regulator and a fixed loss that does not depend on the output current of the switching regulator. The loss that depends on the output current includes power loss resulting from the ON-resistance of a transistor. The fixed loss that does not depend on the output current includes power loss resulting from the activation and inactivation of a main switching transistor and loss caused by power consumption of the switching regulator itself. When the output current is large (difference between the input current and the output current being small), the loss that depends on the output current becomes large. However, the conversion efficiency of the entire switching regulator is satisfactory since the fixed loss is constant. On the other hand, if the output current decreases (difference between the input current and the output current becoming large), the conversion efficiency decreases since the percentage of the fixed loss with respect to the loss depending on the output current increases.

The fixed loss of the switching regulator is proportional to the switching frequency for activating and inactivating the main switching transistor. Thus, the power loss may be reduced by lowering the switching frequency. However, this would increase ripple of the output voltage.

Japanese Laid-Open Patent Publication No. 2003-9515 describes a power supply system including a switching regulator and a linear regulator. The system switches between the two regulators in accordance with the load current. The loss of the linear regulator is determined by the difference between the input voltage and the output voltage and is not dependent on the difference between the input current and the output current. Thus, the linear regulator realizes high conversion efficiency in low load states.

SUMMARY OF THE INVENTION

The power supply system described in Japanese Laid-Open Patent Publication No. 2003-9515 requires the switching regulator and the linear regulator that operates independently. Further, when actually installing such a power supply system in an electronic device, a determination circuit for determining the level of the load current and a switching control circuit become necessary. This enlarges the area of the entire system, the area of the chip on which the power supply system is mounted, and the size of the electronic device.

The present invention provides a DC-DC converter, a controller for a DC-DC converter, and a method for controlling a DC-DC converter that prevent an increase in area and obtains high conversion efficiency irrespective of the level of the output current.

One aspect of the present invention is a DC-DC converter for generating output voltage from input voltage. The DC-DC converter includes a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. A controller, connected to the first output transistor and the second output transistor, controls the first output transistor and the second output transistor in a first operation mode or a second operation mode based on the output voltage of the DC-DC converter or output current, in which the output current changes in accordance with the output voltage. The controller activates and inactivates the first output transistor and the second output transistor in a complementary manner during the first operation mode. Further, the controller inactivates the second output transistor and performs linear operation with the first output transistor during the second operation mode.

Another aspect of the present invention is a DC-DC converter for generating output voltage from input voltage. The DC-DC converter includes a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. A controller, connected to the first output transistor and the second output transistor, controls the first output transistor and the second output transistor in a first operation mode, a second operation mode, or a third operation mode based on the output voltage of the DC-DC converter or output current, in which the output current changes in accordance with the output voltage. The controller activates and inactivates the first output transistor and the second output transistor in a complementary manner during the first operation mode. Further, the controller inactivates the second output transistor and activates and inactivates the first output transistor during the second operation mode. The controller inactivates the second output transistor and performs linear operation with the first output transistor during the third operation mode.

A further aspect of the present invention is a controller for a DC-DC converter including a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. The controller includes a circuit for controlling the first output transistor and the second output transistor in a first operation mode or a second operation mode based on the output voltage of the DC-DC converter or output current, in which the output current changes in accordance with the output voltage. The circuit activates and inactivates the first output transistor and the second output transistor in a complementary manner during the first operation mode. Further, the circuit inactivates the second output transistor and performs linear operation with the first output transistor during the second operation mode.

Another aspect of the present invention is a controller for a DC-DC converter including a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. The controller includes a circuit for controlling the first output transistor and the second output transistor in a first operation mode, a second operation mode, or a third operation mode based on the output voltage of the DC-DC converter or output current, in which the output current changes in accordance with the output voltage. The circuit activates and inactivates the first output transistor and the second output transistor in a complementary manner during the first operation mode. Further, the circuit inactivates the second output transistor and activates and inactivates the first output transistor during the second operation mode. The circuit inactivates the second output transistor and performs linear operation with the first output transistor during the third operation mode.

A further aspect of the present invention is a method for controlling a DC-DC converter for generating output voltage from input voltage. The DC-DC converter includes a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. The method including detecting the output voltage of the DC-DC converter or output current, in which the output current changes in accordance with the output voltage, controlling the first output transistor and the second output transistor in a first operation mode or a second operation mode based on the detected output voltage or the output current. The controlling including, activating and inactivating the first output transistor and the second output transistor in a complementary manner during the first operation mode, and inactivating the second output transistor and performing linear operation with the first output transistor during the second operation mode.

Another aspect of the present invention is a method for controlling a DC-DC converter for generating output voltage from input voltage. The DC-DC converter includes a first output transistor. A second output transistor is connected in series to the first output transistor. A choke coil is connected to a node between the first output transistor and the second output transistor with at least either one of the first output transistor and the second output transistor being operated to generate the output voltage of the DC-DC converter based on the input voltage. A smoothing capacitor, connected to the choke coil, smoothes the output voltage of the DC-DC converter. The method includes detecting the output voltage of the DC-DC converter or output current, in which the output current changes in accordance with the output voltage, controlling the first output transistor and the second output transistor in a first operation mode, a second operation mode, or a third operation mode based on the detected output voltage or the output current. The controlling including, activating and inactivating the first output transistor and the second output transistor in a complementary manner during the first operation mode, inactivating the second output transistor and activating and inactivating the first output transistor during the second operation mode, and inactivating the second output transistor and performing linear operation with the first output transistor during the third operation mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
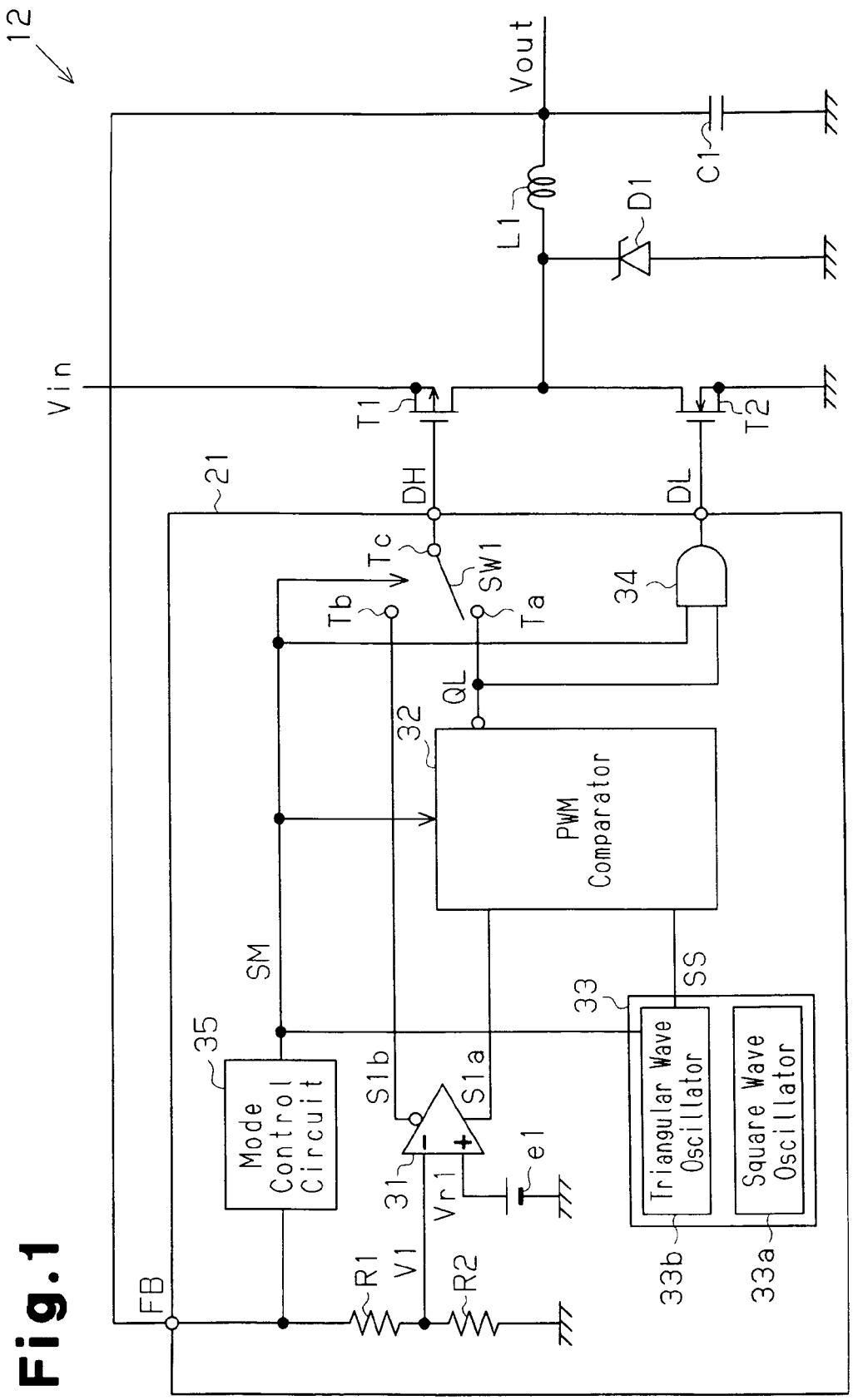
FIG. 1 is a schematic block diagram of a DC-DC converter according to a first embodiment of the present invention.

In the drawings like numerals are used for like elements throughout.

A DC-DC converter 12 according to a first embodiment of the present invention will now be described with reference to the drawings.

Figure 4:
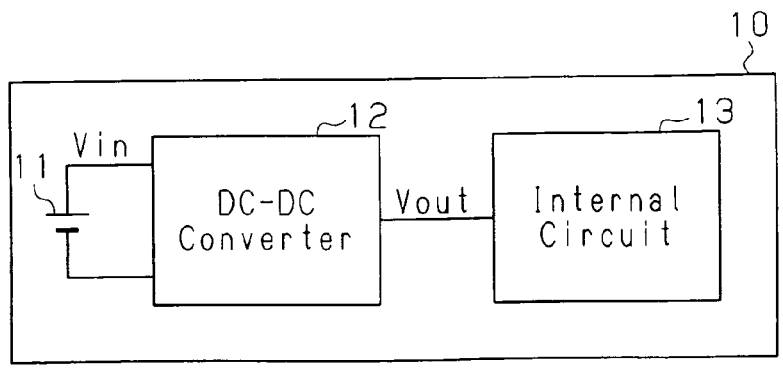
FIG. 4 is a schematic block diagram of an electronic device including the DC-DC converter of FIG. 1.

FIG. 4 is a schematic block diagram of an electronic device 10 including the DC-DC converter 12. The electronic device 10 is portable and is powered by a built-in battery 11. The battery 11 is connected to the DC-DC converter 12, which functions as a power supply circuit. The DC-DC converter 12 is connected to an internal circuit 13 such as a CPU. The DC-DC converter 12 converts input voltage Vin supplied from the battery 11 to output voltage Vout, which is a constant voltage for operating the internal circuit 13 and supplies the output voltage Vout to the internal circuit 13.

The configuration of the DC-DC converter 12 will now be described.

The DC-DC converter 12 shown in FIG. 1 is a voltage controlling mode DC-DC converter and includes a controller 21, an output transistor T1 serving as a main switching transistor, an output transistor T2 serving as a synchronous rectifying transistor, a choke coil L1, a diode D1, and a smoothing capacitor C1.

The controller 21 provides a control signal DH to the gate of the output transistor T1 and a control signal DL to the gate of the output transistor T2. The output transistor T1 is a P-channel MOS transistor, the source of which is supplied with the input voltage Vin and the drain of which is connected to the output transistor T2. The output transistor T2 is an N-channel MOS transistor, the source of which is connected to a low potential power supply (ground) and the drain of which is connected to the output transistor T1. The output transistor T1 is activated and inactivated in response to the control signal DH and the output transistor T2 is activated and inactivated in response to the control signal DL.

The choke coil L1 has a first terminal, which is connected to a node between the drain of the output transistor T1 and the drain of the output transistor T2, and a second terminal, which is connected to the internal circuit 13 (refer to FIG. 4) serving as the load.

The cathode of the diode D1 is connected to the first terminal of the choke coil L1, and the anode of the diode D1 is connected to the ground. The first terminal of the smoothing capacitor C1, which smoothes the output voltage Vout, is connected to the second terminal of the choke coil L1, and the second terminal of the capacitor C1 is connected to the ground. The output voltage Vout or the voltage at the second terminal of the choke coil L1 is fed back to the controller 21 as a feedback signal FB.

The controller 21 is configured to be operated by the input voltage Vin supplied as power supply voltage Vcc (not shown).

The controller 21 includes an error amplifier 31, a PWM comparator 32, an oscillator 33, an AND circuit 34 serving as a signal control circuit, a mode control circuit 35, resistors R1 and R2, a reference power supply e1, and a switch SW1 serving as a selection circuit.

The feedback signal FB is provided to a first terminal of the first resistor R1. A second terminal of the first resistor R1 is connected to a first terminal of the second resistor R2, and a second terminal of the second resistor R2 is connected to the ground. The first resistor R1 and the second resistor R2 configure a voltage dividing circuit. The voltage dividing circuit divides the output voltage Vout input as the feedback signal FB with the first and second resistors R1 and R2 to generate a comparison voltage V1. The comparison voltage V1 is input to the error amplifier 31.

The error amplifier 31 includes an inverting input terminal and a non-inverting input terminal. The comparison voltage V1, that is, the divided voltage of the output voltage Vout is supplied to the inverting input terminal, and a reference voltage Vr1 is supplied to the non-inverting input terminal from the reference power supply e1. The error amplifier 31, which includes a non-inverting output terminal and an inverting output terminal, amplifies the voltage difference between the reference voltage Vr1 and the comparison voltage V1 in accordance with the comparison result of the reference voltage Vr1 and the comparison voltage V1 (divided voltage of the output voltage Vout) to generate complementary error signals S1a and S1b. In the present embodiment, the error amplifier 31 increases the voltage of the first error signal S1a in accordance with the voltage difference when the comparison voltage V1 supplied to the inverting input terminal is lower than the reference voltage Vr1 supplied to the non-inverting input terminal. The error amplifier 31 also decreases the voltage of the first error signal S1a in accordance with the voltage difference when the comparison voltage V1 is higher than the reference voltage Vr1. The second error signal S1b changes in an inverse manner with respect to the first error signal S1a.

The first error signal S1a output from the error amplifier 31 is provided to the PWM comparator 32. The PWM comparator 32 includes a non-inverting input terminal and an inverting input terminal. The non-inverting input terminal is provided with the first error signal S1a from the error amplifier 31 and the inverting input terminal is provided with an output signal of the oscillator 33. The oscillator 33 includes a square wave oscillator 33a and a triangular wave oscillator 33b. The square wave oscillator 33a oscillates and generates a pulse-shaped signal SP having a constant frequency. The triangular wave oscillator 33b oscillates and generates a triangular wave signal SS having a constant frequency. The triangular wave signal SS is provided to the inverting input terminal of the PWM comparator 32.

The PWM comparator 32, which compares the first error signal S1a from the error amplifier 31 and the triangular wave signal SS from the triangular wave oscillator 33b, outputs a signal QL having a level corresponding to the comparison result from an inverting output terminal. The PWM comparator 32 generates the signal QL with an L level when the voltage of the first error signal S1a is higher than the voltage of the triangular wave signal SS. Further, the PWM comparator 32 generates the signal QL with an H level when the voltage of the first error signal S1a is lower than the voltage of the triangular wave signal SS. The signal QL is provided to the switch SW1 and the AND circuit 34.

The switch SW1 includes two switching terminals Ta and Tb and a common terminal Tc. The signal QL is provided to the first switching terminal Ta and the second error signal S1b is provided to the second switching terminal Tb. The common terminal Tc of the switch SW1 is connected to the gate of the output transistor T1. The switch SW1 connects the common terminal Tc to either the first switching terminal Ta or the second switching terminal Tb in response to a mode control signal SM provided from the mode control circuit 35. Therefore, the switch SW1 selects either the signal QL or the second error signal S1b to output a control signal DH, which corresponds to the selected signal, to the common terminal Tc. The control signal DH is then provided to the output transistor T1, and the output transistor T1 operates in response to the control signal DH.

The AND circuit 34 is a logic circuit having two input terminals, in which a first input terminal is provided with the signal QL and a second input terminal is provided with the mode control signal SM. The output terminal of the AND circuit 34 is connected to the gate of the output transistor T2.

The AND circuit 34 performs an AND operation with the signal QL and the mode control signal SM to generate a control signal DL indicating the operation result. Accordingly, the control signal DL has an H level when the signal QL and the mode control signal SM both have an H level. Further, the control signal DL has an L level when at least one of either the signal QL or the mode control signal SM has an L level. The control signal DL is provided to the output transistor T2. The output transistor T2 is activated and inactivated in response to the control signal DL.

The mode control circuit 35, which detects the output power Vout of the DC-DC converter 12, generates the mode control signal SM to change the operation mode of the DC-DC converter 12 in accordance with the detection result. The operation modes of the DC-DC converter 12 include a PWM operation mode and a linear operation mode. In the PWM operation mode, the DC-DC converter 12 performs PWM operation to change the pulse width of the control signals DH and DL for performing ON/OFF control on the output transistors T1 and T2 in accordance with the output voltage Vout to convert the input voltage Vin to the output voltage Vout. In the linear operating mode, the DC-DC converter 12 turns OFF the output transistor T2 and controls the gate voltage of the output transistor T1 to convert the input voltage Vin to the output voltage Vout.

That is, the mode control circuit 35 operates the DC-DC converter 12 as a switching regulator that performs ON/OFF control on the output transistors T1 and T2 to convert the input voltage Vin to the output voltage Vout. Alternatively, the mode control circuit 35 operates the DC-DC converter 12 as a linear regulator that controls the gate voltage of the output transistor T1 to convert the input voltage Vin to the output voltage Vout.

Specifically, the mode control circuit 35 of the present embodiment determines the output voltage Vout with the feedback signal FB to generate the mode control signal SM corresponding to the detected result. During the PWM operation, when the output voltage Vout is supplied from the DC-DC converter 12 to the internal circuit 13 serving as the load, the output voltage Vout increases as the current amount required in the internal circuit 13 decreases. That is, the output voltage Vout increases as the load of the DC-DC converter 12 is reduced. Thus, the mode control circuit 35 detects that the load has been reduced from the increase in the output voltage Vout.

The mode control circuit 35 compares the output voltage Vout with a predetermined reference voltage. Based on the comparison result, the mode control circuit 35 generates the mode control signal SM with an H level when the output voltage Vout is higher than the reference voltage. Further, the mode control circuit 35 generates the mode control signal SM with an L level when the output voltage Vout is lower than the reference voltage. The mode control signal SM is provided to the PWM comparator 32, the oscillator 33, the switch SW1 and the AND circuit 34.

The switch SW1 connects the common terminal Tc to the first switching terminal Ta in response to the mode control signal SM of an H level to output the control signal DH having substantially the same level as the signal QL to the common terminal Tc. The AND circuit 34 generates the control signal DL having a level that is substantially the same as the signal QL in response to the mode control signal SM having an H level. In other words, the control signals DH and DL are generated to have the same phase as the signal QL. Thus, the output transistor T1 provided with the control signal DH and the output transistor T2 provided with the control signal DL are activated and inactivated in a complementary manner, and the DC-DC converter 12 operates as a switching regulator that converts the input voltage Vin to the output voltage Vout in accordance with the activation and inactivation of the two transistors T1 and T2.

The switch SW1 connects the common terminal Tc to the second switching terminal Tb in response to the mode control signal SM of an L level to output the control signal DH having substantially the same level as the second error signal S1b to the common terminal Tc. The AND circuit 34 outputs the control signal DL of an L level in response to the mode control signal SM of an L level. Thus, the output transistor T1 provided with the control signal DH results in the flow of current corresponding to the second error signal Sib, and the output transistor T2 provided with the control signal DL is turned OFF. Therefore, the DC-DC converter 12 operates as a linear regulator that controls the ON-resistance value of the output transistor T1 and converts the input voltage Vin to the output Voltage Vout.

The configuration of the mode control circuit 35 will now be described.

Figure 2:
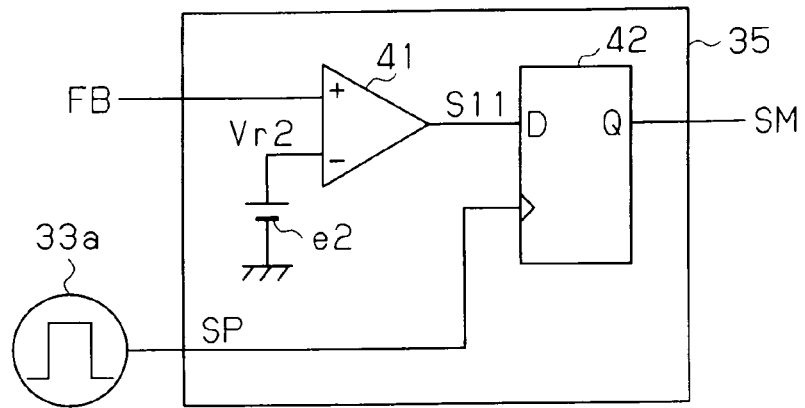
FIG. 2 is a schematic block diagram of a mode control circuit of the DC-DC converter shown in FIG. 1.

FIG. 2 is a schematic block diagram of the mode control circuit 35 in the first embodiment of the present invention. The mode control circuit 35 includes a voltage comparator 41, a flip-flop circuit (hereinafter referred to as FF circuit) 42, and a reference power supply e2. The feedback signal FB is provided to a non-inverting input terminal of the voltage comparator 41, and the reference voltage Vr2 from the reference power supply e2 is supplied to the inverting input terminal to serve as a reference value. The voltage comparator 41 compares the voltage of the feedback signal FB and the reference voltage Vr2 to generate the signal S11 corresponding to the comparison result.

The FF circuit 42, which is a D-type flip-flop circuit, includes a data input terminal D provided with the signal S11 and a clock input terminal provided with the pulse-shaped signal SP generated in the square wave oscillator 33a. The FF circuit 42 holds the signal S11 in synchronization with the signal SP to generate the mode control signal SM with substantially the same level as the held signal S11.

Therefore, the mode control circuit 35 compares the reference voltage Vr2 and the voltage of the feedback signal FB, or the reference voltage Vr2 and the output voltage Vout, to generate the mode control signal SM based on the comparison result and hold the level of the mode control signal SM.

The mode control circuit 35 generates the mode control signal SM having an H level when the output voltage Vout is higher than the reference voltage Vr2. Further, the mode control circuit 35 generates the mode control signal SM having an L level when the output voltage Vout is lower than the reference voltage Vr2.

Figure 3:
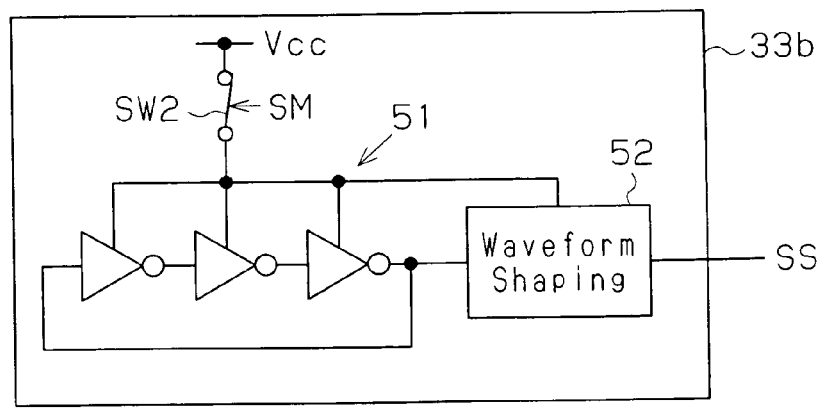
FIG. 3 is a schematic circuit diagram of a triangular wave oscillator of the DC-DC converter shown in FIG. 1.

As shown in FIG. 1, the mode control signal SM is provided to the PWM comparator 32 and to the triangular wave oscillator 33b of the oscillator 33. The triangular wave oscillator 33b includes a ring oscillator 51 and a waveform shaping circuit 52, as shown in FIG. 3. The ring oscillator 51 includes an odd number (three in FIG. 3) of inverter circuits connected in a ring to generate a signal having a predetermined frequency. The waveform shaping circuit 52 shapes the signal output from the ring oscillator 51 into a triangular shape and generates the triangular wave signal SS. The power supply voltage Vcc is supplied to the ring oscillator 51 and the waveform shaping circuit 52 via the switch SW2. The switch SW2 is turned ON by the mode control signal SM of an H level and turned OFF by the mode control signal SM of an L level. Therefore, when the mode control signal SM has an H level, that is, during the PWM operation mode, the power supply voltage Vcc is provided to the ring oscillator 51 and the waveform shaping circuit 52. Thus, the triangular wave oscillator 33b generates the triangular wave signal SS. On the other hand, when the mode control signal SM has an L level, that is, during the linear operation mode, the power supply voltage Vcc is not supplied to the ring oscillator 51 or the waveform shaping circuit 52. Thus, power is not consumed in the triangular wave oscillator 33b, and power consumption during linear operation mode is reduced. Although not apparent from the drawings, the PWM comparator 32 is configured so that it controls and allows or stops the supply of power supply voltage Vcc to the elements of the PWM comparator 32 with the mode control signal SM in the same manner as the ring oscillator 51. Thus reduces power consumption in the PWM comparator 32 and reduces power consumption during linear operation mode.

The operation of the DC-DC converter 12 configured as above will now be described.

The input voltage Vin supplied from the battery 11 shown in FIG. 4 decreases through use of electronic device 10 or through discharge. The mode control circuit 35 of the DC-DC converter 12 generates the mode control signal of an H level when the voltage of the feedback signal FB, that is, the output voltage Vout, is higher than the reference voltage Vr2. Further, the mode control circuit 35 generates the mode control signal SM of an L level when the output voltage Vout is lower than the reference voltage Vr2.

[When Mode Control Signal SM has an H Level]

The oscillator 33 oscillates and operates in response to the mode control signal SM of an H level and generates the triangular wave signal SS. The PWM comparator 32 operates in response to the mode control signal SM of an H level, compares the triangular wave signal SS and the first error signal S1a provided from the error amplifier 31, and generates the signal QL corresponding to the comparison result. The switch SW1 connects the common terminal Tc to the first switching terminal Ta in response to the mode control signal SM of an H level and provides the signal QL from the PWM comparator 32 to the output transistor T1 as the control signal DH. The AND circuit 34 provides the signal QL provided from the PWM comparator 32 to the output transistor T2 as the control signal DL in response to the mode control signal SM having an H level. Therefore, the output transistors T1, T2 are activated and inactivated in a complementary manner.

The output voltage Vout increases during the period the output transistor T1 is activated. The output voltage Vout is smoothed by the smoothing capacitor C1. When the output transistor T1 is turned OFF, the energy stored in the choke coil L1 is released. As the energy stored in the choke coil L1 decreases and the output voltage Vout lowers, the comparison voltage V1 generated by the resistors R1 and R2 become lower than the reference voltage Vr1. This turns ON the output transistor T1.

When the output voltage Vout increases, the voltage of the first error signal S1a from the error amplifier 31 decreases and widens the pulse width of the signal QL. Consequently, the ON time of the output transistor T1 becomes relatively short, and the potential of the output voltage Vout is lowered. On the other hand, when the output voltage Vout decreases, the voltage of the first error signal S1a from the error amplifier 31 increases as the pulse width of the signal QL becomes narrow. Consequently, the ON time of the output transistor T1 becomes relatively long, and the potential of the output voltage Vout is raised. The DC-DC converter 12 thus operates as a switching regulator that activates and inactivates the output transistors T1 and T2 and holds the output voltage Vout at a constant voltage based on the reference voltage Vr1.

[When Mode Control Signal SM is L Level]

When the mode control signal SM of an L level stops the supply of power supply voltage Vcc, the PWM comparator 32 and the oscillator 33 stop operating. The switch SW1 connects the common terminal Tc to the second switching terminal Tb in response to the mode control signal SM of the L level. This provides the second error signal S1b to the output transistor T1 as the control signal DH. The AND circuit 34 provides the control signal DL of an L level to the output transistor T2 in response to the mode control signal SM of the L level, and the output transistor T2 is turned OFF by the control signal DL of the L level.

The error amplifier 31 amplifies the difference between the comparison voltage V1 and the reference voltage Vr1. Thus, the second error signal S1b, which is output to the inverting output terminal of the error amplifier 31, has a lower voltage as the output voltage Vout becomes lower and a higher voltage as the output voltage Vout becomes higher and approaches the reference voltage Vr1.

The second error signal S1b is provided to the gate of the output transistor T1. When the output voltage Vout decreases, the gate voltage of the output transistor T1 also decreases. Since the output transistor T1 is a P-channel MOS transistor, the ON-resistance value becomes lower as the gate voltage decreases. Consequently, the voltage decreased by the ON-resistance of the output transistor T1 becomes less and raises the output voltage Vout.

When the output voltage Vout increases, the voltage of the second error signal S1b output to the inverting output terminal of the error amplifier 31 also increases. This increases the gate voltage of the output transistor T1. Since the output transistor T1 is a P-channel MOS transistor, the ON-resistance value becomes larger as the gate voltage increases. Consequently, the voltage decreased by the ON-resistance of the output transistor T1 becomes greater and lowers the output voltage Vout.

In this manner, the DC-DC converter 12 operates as a linear regulator when the second error signal S1b output to the inverting output terminal of the error amplifier 31 is provided to the gate of the output transistor T1, and maintains the output voltage Vout at a constant voltage that is based on the reference voltage Vr1. Since the linear regulator does not involve a switching operation, ripple voltage of the output voltage Vout is suppressed to an extremely low value. Further, in the DC-DC converter 12, the PWM comparator 32 and the triangular wave oscillator 33b stop operating. Since the power consumption in the PWM comparator 32 and the triangular wave oscillator 33b is a fixed loss of the DC-DC converter 12, the fixed loss in the controller 21 of the DC-DC converter 12 is reduced.

The DC-DC converter 12 of the first embodiment has the advantages described below.

The mode control circuit 35 of the controller 21 determines that the DC-DC converter 12 is in the PWM operation mode or the linear operation mode based on the output voltage Vout. The controller 21 operates the DC-DC converter 12 as a switching regulator that activates and inactivates the first output transistor T1 and the second output transistor T2 in a complementary manner during the PWM operation mode. The controller 21 operates the DC-DC converter 12 as a linear regulator that turns OFF the second output transistor T2 and controls the ON-resistance value of the first output transistor T1 for linear operation during the linear operation mode. Therefore, the DC-DC converter 12 functions as either the switching regulator or the linear regulator in accordance with the output voltage Vout. This reduces the area of the entire system in comparison to when the switching regulator and the linear regulator are separate. Further, in accordance with the output voltage Vout, the DC-DC converter 12 operates as the switching regulator when the output current is large and operates as the linear regulator when the output current is small. Thus, the DC-DC converter 12 performs conversion with high conversion efficiency in accordance with the output voltage Vout and has satisfactory conversion efficiency irrespective of the level of the output current.

The mode control circuit 35 compares the reference voltage Vr2 with the output voltage Vout to determine that the DC-DC converter 12 is in the PWM operation mode when the output voltage Vout is greater than the reference voltage Vr2. Further, the mode control circuit 35 determines that the DC-DC converter 12 is in the linear operation mode when the output voltage Vout is smaller than the reference voltage Vr2. Then, the mode control circuit 35 generates the mode control signal SM in accordance with the determination. Therefore, the DC-DC converter 12 is switched between the switching regulator and the linear regulator as the controller 21 operates the first output transistor T1 and the second output transistor T2 based on the mode control signal SM.

At least either one of the triangular wave oscillator 33b and the PWM comparator 32 stops operating during the linear operation mode based on the mode control signal SM. This reduces the power consumption and obtains high conversion efficiency.

A DC-DC converter 12a according to a second embodiment of the present invention will now be described with reference to the drawings.

Figure 5:
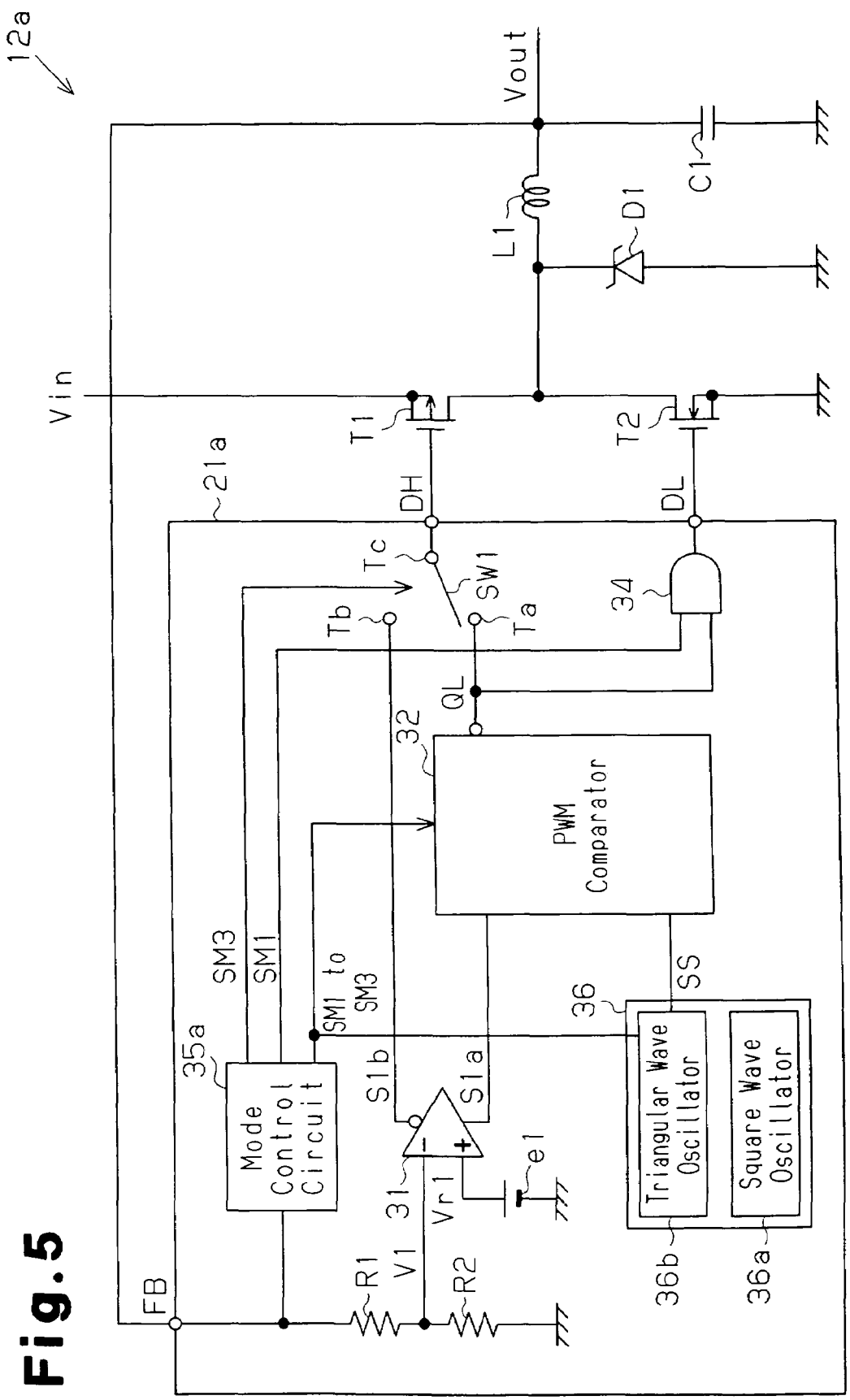
FIG. 5 is a schematic block diagram of a DC-DC converter according to a second embodiment of the present invention.

FIG. 5 is a schematic block diagram of the DC-DC converter 12a in the second embodiment of the present invention. The DC-DC converter 12a is a voltage controlling mode DC-DC converter and similar to that of the first embodiment. The DC-DC converter 12a replaces the DC-DC converter 12 of the first embodiment. More specifically, the DC-DC converter 12a converts the input voltage Vin input from the battery 11 shown in FIG. 4 into the output voltage Vout, which is a constant voltage for operating the internal circuit 13, and supplies the output voltage Vout to the internal circuit 13.

The DC-DC converter 12a includes a controller 21a, an output transistor T1 serving as a main switching transistor, an output transistor T2 serving as a synchronous rectifying transistor, a choke coil L1, a diode D1, and a smoothing capacitor C1.

The controller 21a includes the error amplifier 31, the PWM comparator 32, the oscillator 36, the AND circuit 34 serving as a signal control circuit, a mode control circuit 35a, resistors R1 and R2, the reference power supply e1, and the switch SW1 serving as a selection circuit. The oscillator 36 includes a square wave oscillator 36a and a triangular wave oscillator 36b.

The mode control circuit 35a, which detects the output power of the DC-DC converter 12a, generates a plurality of mode control signals SM1 to SM3 for changing the operation mode of the DC-DC converter in accordance with the detected result. The DC-DC converter 12a enters a PWM operation mode, a PFM operation mode, and a linear operation mode. The PWM operation mode is a switching operation mode that activates and inactivates the output transistors T1 and T2 through PWM control to convert the input voltage Vin to the output voltage Vout. The PFM operation mode is a switching operation mode that activates and inactivates the output transistor T1 at a frequency lower than the PWM operation mode to convert the input voltage Vin to the output voltage Vout. The linear operation mode is an operation mode that turns OFF the output transistor T2, controls the gate voltage of the output transistor T1, and converts the input voltage Vin to the output voltage Vout. The mode control circuit 35a detects the output power Vout of the DC-DC converter 12a and generates the mode control signals SM1 to SM3 based on the detected result.

Specifically, the mode control circuit 35a of the second embodiment detects the output voltage Vout from the feedback signal FB and generates the mode control signals SM1 to SM 3 corresponding to the detected result. When supplying the output voltage Vout from the DC-DC converter 12a operating in the PWM operation or the PFM operation to the internal circuit 13 (refer to FIG. 4) serving as the load, the output voltage Vout increases when the amount of current required in the internal circuit 13 decreases. That is, the output voltage Vout increases as the load of the DC-DC converter 12a becomes less. Thus, the mode control circuit 35a detects that the load has become less from increase in the output voltage Vout.

Figure 6:
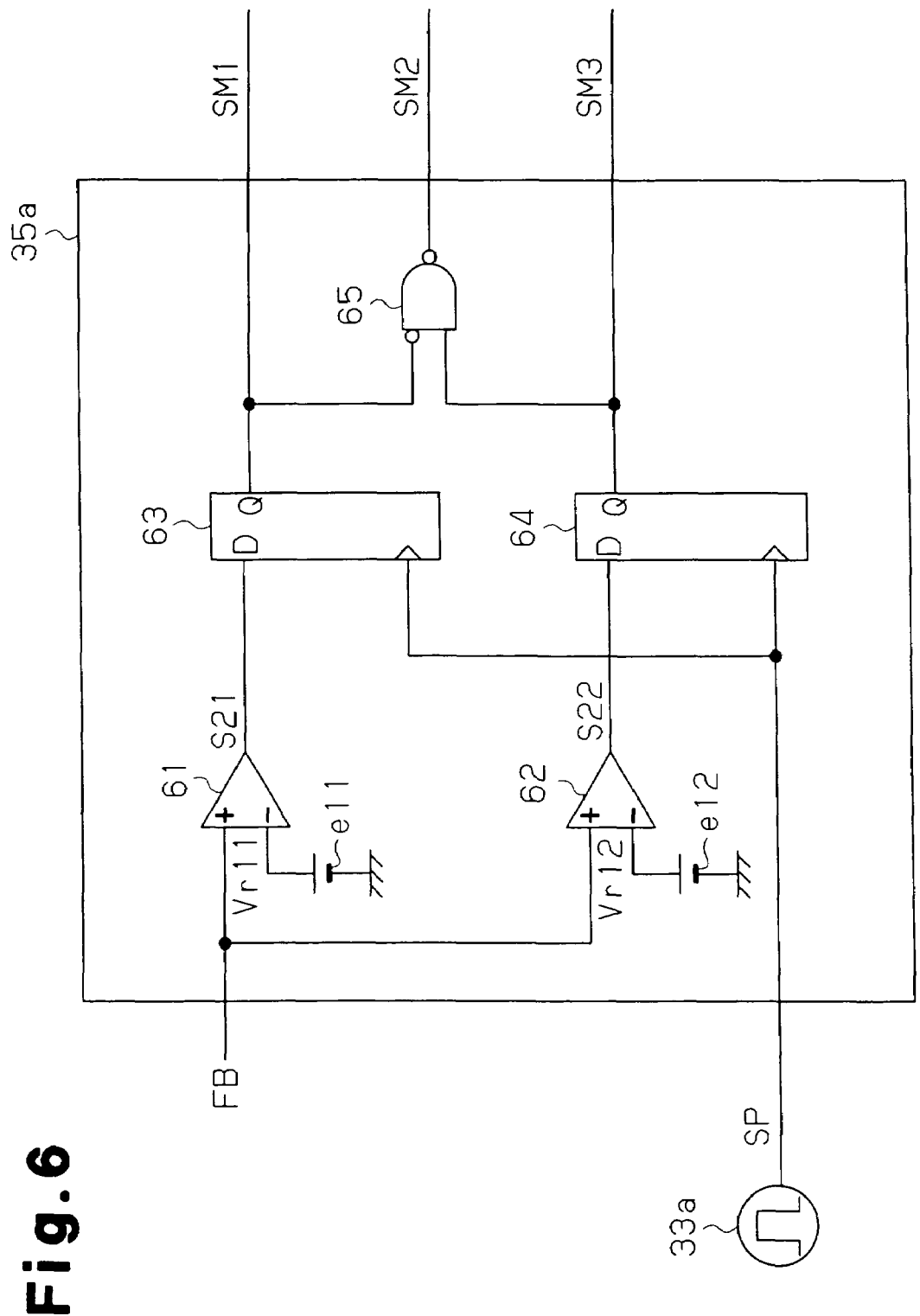
FIG. 6 is a schematic block diagram of a mode control circuit of the DC-DC converter shown in FIG. 5.

FIG. 6 is a schematic block diagram of the mode control circuit 35a in the second embodiment of the present invention. The mode control circuit 35a includes voltage comparators 61 and 62, flip-flop circuits (hereinafter referred to as FF circuit) 63 and 64, and reference power supplies e11 and e12. The feedback signal FB is provided to the non-inverting input terminals of the first and second voltage comparators 61 and 62. The first reference voltage Vr11 from the reference power supply e11 is supplied to the inverting input terminal of the first voltage comparator 61 as the first reference value, and the second reference voltage Vr12 from the reference power supply e12 is supplied to the inverting input terminal of the second voltage comparator 62 as the second reference value. The first reference voltage Vr11 is set higher than the second reference voltage Vr12. The first voltage comparator 61 compares the voltage of the feedback signal FB and the first reference voltage Vr11 to generate a signal S21 corresponding to the comparison result. The second voltage comparator 62 compares the voltage of the feedback signal FB and the second reference voltage Vr12 to generate a signal S22 corresponding to the comparison result.

The FF circuits 63 and 64 are D-type flip-flop circuits, of which clock input terminals are provided with a pulse-shaped signal SP generated in the square wave oscillator 36a. The signal S21 is provided to the data input terminal D of the FF circuit 63, and the signal S22 is provided to the data input terminal D of the FF circuit 64. The first FF circuit 63 holds the signal S21 in synchronization with the signal SP and generates a first mode control signal SM1 having a level that is substantially the same as the held signal S21. The second FF circuit 64 holds the signal S22 in synchronization with the signal SP and generates a third mode control signal SM3 having a level that is substantially the same as the held signal S22. The first and the third mode control signals SM1 and SM3 are provided to a logic circuit 65. The logic circuit 65 performs an AND operation with the inverted signal of the first mode control signal SM1 and the third mode control signal SM3 and performs logic inversion on the AND operation result to generate a second mode control signal SM2.

Accordingly, the mode control circuit 35a compares the predetermined reference voltage Vr11 and the second reference voltage Vr12 with the output voltage Vout to generate the first to the third mode control signals SM1 to SM3 based on the comparison result. The mode control circuit 35a generates the first to the third mode control signals SM1 to SM 3 of an H level when the output voltage Vout is higher than the first reference voltage Vr11. The mode control circuit 35a generates the first and the second mode control signals SM1 and SM2 of an L level and the third mode control signal SM3 of an H level when the output voltage Vout is lower than or equal to the first reference voltage Vr11 and higher than the second reference voltage Vr12. The mode control circuit 35a generates the first and third mode control signals SM1 and SM3 of an L level and the second mode control signal SM2 of an H level when the output voltage Vout is lower than or equal to the second reference voltage Vr12.

The first mode control signal SM1 indicates the PWM operation mode with a positive logic, the second mode control signal indicates the PFM operation mode with a negative logic, and the third mode control signal SM3 indicates the linear operation mode with a negative logic. The first to third mode control signals SM1 to SM3 are provided to the oscillator 36, the first mode control signal SM1 is provided to the AND circuit 34, and the third mode control signal SM3 is provided to the switch SW1.

The switch SW1 connects the common terminal Tc to the first switching terminal Ta in response to the third mode control signal SM3 of an H level to outputs the control signal DH with a level that is substantially the same as the signal QL to the common terminal Tc. The switch SW1 connects the common terminal Tc to the second switching terminal Tb in response to the third mode control signal SM3 of an L level to output the control signal DH having a level that is substantially the same as the second error signal S1b to the common terminal Tc. The third mode control signal SM3 rises to the H level during the PWM operation mode and the PFM operation mode and falls to the L level during the linear operation mode. Therefore, the signal S2 generated in the PWM comparator 32 is provided to the output transistor T1 as the control signal DH during the PWM operation mode and the PFM operation mode, and the second error signal S1b generated in the error amplifier 31 is provided to the output transistor T1 as the control signal DH during the linear operation mode.

The AND circuit 34 generates the control signal DL having a level that is substantially the same as the signal QL in response to the first mode control signal SM1 of an H level. Further, the AND circuit 34 generates the control signal DL of an L level in response to the first control signal SM1 of an L level. The first mode control signal SM1 rises to the H level during the PWM operation mode and falls to the L level during the PFM operation mode and the linear operation mode. Therefore, the output transistor T2 is activated and inactivated in response to the control signal DL during the PWM operation mode and is inactivated during the PFM operation mode and the linear operation mode. In the PWM operation mode, the control signal DH provided to the output transistor T1 and the control signal DL provided to the output transistor T2 are generated based on the signal QL from the PWM comparator 32. The output transistor T1 is a P-channel MOS transistor and the output transistor T2 is an N-channel MOS transistor. Therefore, the output transistor T1 and the output transistor T2 are activated and inactivated in a complementary manner during the PWM operation mode.

The DC-DC converter 12a therefore operates as the switching regulator that activates and inactivates the output transistor T1 and the output transistor T2 in a complementary manner and converts the input voltage Vin to the output voltage Vout during the PWM operation mode. Further, during the PFM operation mode, the DC-DC converter 12a operates as a switching regulator that inactivates the output transistor for synchronization, activates and inactivates the output transistor T1, and converts the input voltage Vin to the output voltage Vout. During the linear operation mode, the DC-DC converter 12a operates as a linear regulator that inactivates the output transistor T2, controls the ON-resistance value of the output transistor T1 with the second error signal S1b, and converts the input voltage Vin to the output voltage Vout.

The oscillator 36 includes the square wave oscillator 36a and the triangular wave oscillator 36b. The square wave oscillator 36a oscillates and operates to generate a pulse-shaped signal SP having a constant frequency. The triangular wave oscillator 36b oscillates and operates to generate a triangular wave signal SS having a constant frequency. The square wave oscillator 36a and the triangular wave oscillator 36b are configured to change the oscillation frequency based on the first to third mode control signals SM1 to SM3.

More specifically, the square wave oscillator 36a and the triangular wave oscillator 36b respectively generate the signals SP and SS of a predetermined frequency during the PWM operation mode based on the first to the third mode control signals SM1 to SM3. The oscillation frequency at this point is set so that a ripple is not produced or is extremely small in the output voltage Vout due to the activation an inactivation of the output transistors T1 and T2. The square wave oscillator 36a and the triangular wave oscillator 36b respectively generate the signals SP and SS having a frequency lower (e.g., ½) than the predetermined frequency during the PFM operation mode. Thus, during the PFM operation mode, the frequency of activation and inactivation of the output transistor T1 per unit time, and the operation frequency of the PWM comparator 32 and oscillator 36 are reduced compared to the PWM operation mode. This reduces power loss and power consumption thereby enhancing conversion efficiency.

Further, the triangular wave oscillator 36b stops oscillation during the linear operation mode based on the first to the third mode control signals SM1 to SM3 in the same manner as in the first embodiment. Specifically, the supply of power supply Vcc to the triangular wave oscillator 36b is stopped when the third mode control signal SM3 falls to the L level in correspondence to the linear operation mode. Thus, the power consumption in the mode control circuit 35a is reduced.

The DC-DC converter 12a of the second embodiment has the advantages described below.

The mode control circuit 35a of the controller 21a determines that the DC-DC converter 12 is in the PWM operation mode, the PFM operation mode, or the linear operation mode based on the output voltage Vout. The controller 21a operates the DC-DC converter 12a as the PWM switching regulator that activates and inactivates the first output transistor T1 and the second output transistor T2 in complementary manner during the PWM operation mode. The controller 21a operates the DC-DC converter 12a as the PFM switching regulator that inactivates the second output transistor T2 and activates and inactivates the first output transistor T1 in a period longer than the PWM operation mode during the PFM operation mode. The controller 21a operates the DC-DC converter 12 as a linear regulator that inactivates the second output transistor T2 and controls the ON-resistance value of the first output transistor T1. That is, the controller 21a has the DC-DC converter 12 perform the linear operation. Therefore, since the DC-DC converter 12 operates as the PWM switching regulator, the PFM switching regulator, or the linear regulator, the area of the entire system is small compared to when using separate switching and linear regulators. This prevents the area from increasing.

Further, in accordance with the output voltage Vout, the DC-DC converter 12a functions as a PWM switching regulator when the output current is large, a PFM switching regulator when the output current is intermediate, and a linear regulator when the output current is small. Therefore, the DC-DC converter 12a operates as a regulator having satisfactory conversion efficiency in accordance with the output voltage Vout, and high conversion efficiency is obtained irrespective of the size of the output current.

The mode control circuit 35a compares the first and second reference voltages Vr11 and Vr12 with the output voltage Vout and determines that the DC-DC converter 12 is in the PWM operation mode when the output voltage Vout is higher than the first reference voltage Vr11, in the PFM operation mode when the output voltage Vout is lower than or equal to the first reference voltage Vr11 and higher than the second reference voltage Vr12, and in the linear operation mode when the output voltage Vout is lower than or equal to the second reference voltage vr12. Then, the mode control circuit 35a generates the first to third mode control signals SM1 to SM3 based on the determination result. Therefore, when the controller 21a operates the first output transistor T1 and the second output transistor T2 based on the first to the third mode control signals SM1 to SM3, the operation of the DC-DC converter 12a is switched between the PWM switching regulator, the PFM switching regulator, and the linear regulator.

At least either one of the triangular wave oscillator 36b and the PWM comparator 32 stops operating during the linear operation mode based on the mode control signals SM1 to SM3. This reduces the power consumption and obtains high conversion efficiency.

A DC-DC converter 70 according to a third embodiment of the present invention will now be described with reference to the drawings.

Figure 7:
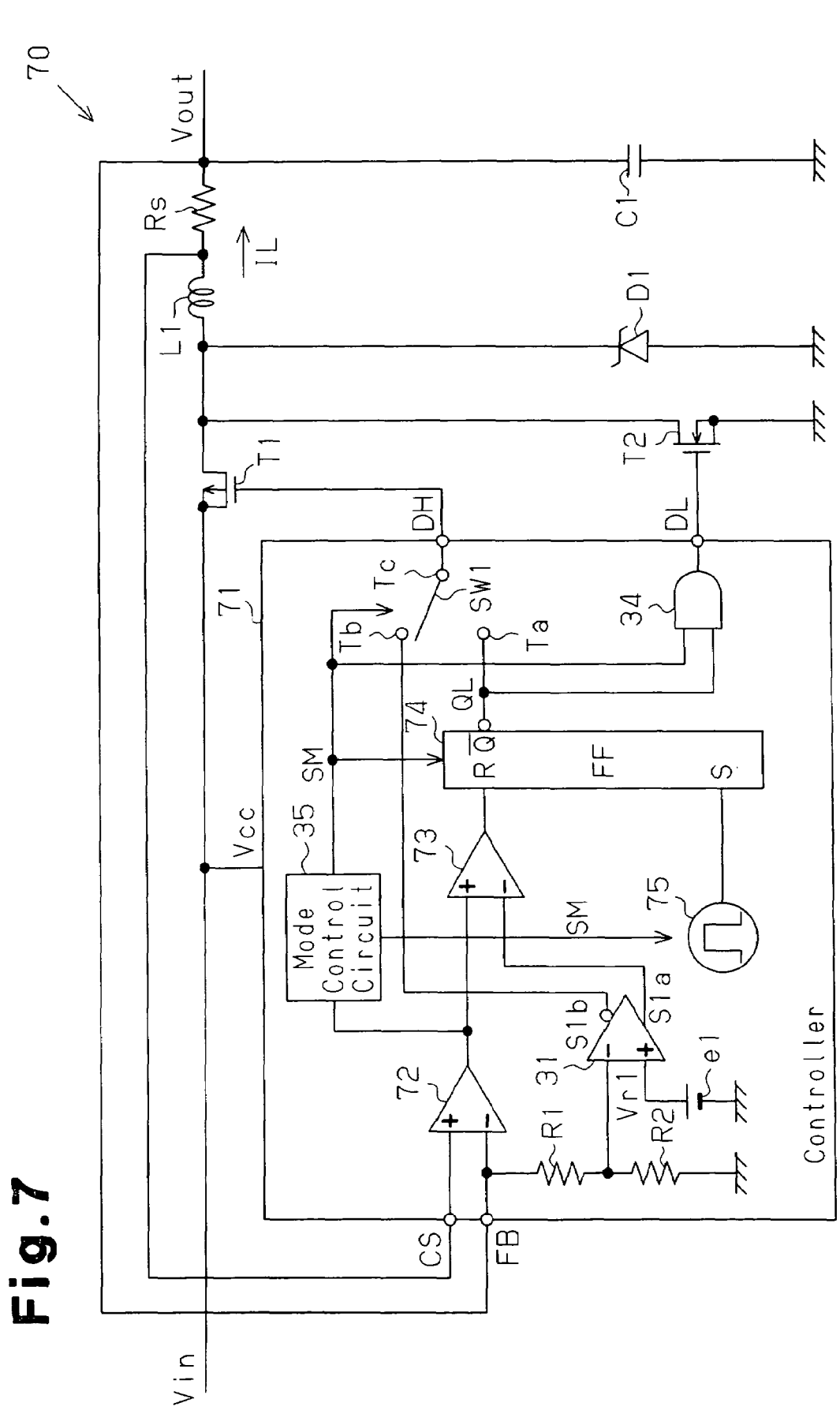
FIG. 7 is a schematic block diagram of a DC-DC converter according to a third embodiment of the present invention.

FIG. 7 is a schematic block diagram of a DC-DC converter 70 according to a third embodiment of the present invention. The DC-DC converter 70, which is a current controlling mode DC-DC converter, includes a controller 71, the output transistors T1 and T2, the choke coil L1, the smoothing capacitor C1, the diode D1, and a current detection resistor Rs. The output voltage Vout is output via the current detection resistor Rs.

In the controller 71, the feedback signal CS having the voltage of the first terminal of the current detection resistor Rs is provided to a non-inverting input terminal of a voltage amplifier 72. The feedback signal FB having the voltage of the second terminal of the current detection resistor Rs is provided to an inverting input terminal of the voltage amplifier 72. The voltage amplifier 72 amplifies the voltage generated between the two terminals of the current detection resistor Rs based on the output current flowing through the current detection resistor Rs. Then, the voltage amplifier 72 supplies the amplified voltage to a comparator 73. The error amplifier 31 of the controller 71 amplifies the voltage difference between the voltage generated by dividing the voltage (i.e., output voltage Vout) of the feedback signal FB with resistors R1 and R2 and the reference voltage Vr1 from the reference power supply e1 to generate the error signals S1a and S1b. The first error signal S1a is provided to the comparator 73, and the second error signal S1b is provided to the switch Sw1.

The comparator 73 compares the output voltage of the voltage amplifier 72 and the voltage of the first error signal S1a from the error amplifier 31. Then, the comparator 73 provides the output signal of an H level to the reset terminal R of a flip-flop circuit (hereinafter referred to as an "FF circuit") 74 when the output voltage of the voltage amplifier 72 is higher than the voltage of the first error signal S1a. The output signal of an L level is provided to the reset terminal R when the output voltage of the voltage amplifier 72 is lower than the voltage of the first error signal S1a.

A pulse signal having a constant frequency is provided to a set terminal S of the FF circuit 74 from an oscillator 75. When the signal of an H level is provided to the set terminal S, the FF circuit 74 outputs an output signal QL of an L level to an inverting output terminal /Q, and outputs the output signal QL of an H level to the inverting output terminal /Q when the signal of an H level is provided to a reset terminal R.

The output voltage of the voltage amplifier 72 is supplied to the mode control circuit 35. In the mode control circuit 35 of the third embodiment, the feedback signal FB provided to the non-inverting input terminal of the voltage comparator 41 in the mode control circuit 35 of the first embodiment shown in FIG. 2 is replaced with the output voltage of the voltage amplifier 72. The mode control circuit 35 generates the mode control signal SM based on the output voltage of the voltage amplifier 72. The output voltage of the voltage amplifier 72 corresponds to the voltage difference between the feedback signals CS and FB, that is, corresponds to the output current of the DC-DC converter 70. Therefore, the mode control circuit 35 detects the output current IL of the DC-DC converter 70 and generates the mode control signal SM for changing the operation mode of the DC-DC converter 70 according to the detected result. The mode control signal SM is provided to the switch SW1, the AND circuit 34, and the oscillator 75 in the same manner as in the first embodiment. Although not shown in FIG. 7, the controller 71 includes the square wave oscillator 33a shown in FIG. 2 and is configured to operate the mode control circuit 35 with the signal SP output from the square wave oscillator 33a.

The switch SW1 and the AND circuit 34 are connected to the inverting output terminal /Q of the FF circuit 74. The switch SW1 includes two switching terminals Ta and Tb and a common terminal Tc. The signal QL is provided to the first switching terminal Ta, and the second error signal S1b is provided to the second switching terminal Tb. The common terminal Tc of the switch SW1 is connected to the gate of the output transistor T1. The switch SW1 connects the common terminal Tc to either the first switching terminal Ta or the second switching terminal Tb in response to the mode control signal SM provided from the mode control circuit 35. Therefore, the switch SW1 selects either the signal QL or the second error signal S1b and outputs the control signal DH corresponding to the selected signal to the common terminal Tc. The control signal DH is provided to the output transistor T1, and the output transistor T1 operates in response to the control signal DH.

The AND circuit 34 is a logic circuit having two input terminals, in which a first input terminal is provided with the signal QL and a second input terminal is provided with the mode control signal SM. The output terminal of the AND circuit 34 is connected to the gate of the output transistor T2. The AND circuit 34 performs an AND operation with the signal QL and the mode control signal SM to generate the control signal DL indicating the operation result. Therefore, the control signal DL is set to an H level when the signal QL and the mode control signal SM both have an H level. The control signal DL is set to an L level when at least one of the signal QL and the mode control signal SM has an L level. The control signal DL is provided to the output transistor T2, and the output transistor T2 is activated and inactivated in response to the control signal DL.

The oscillator 75 is configured to oscillate and operate in response to the mode control signal SM of H level to generate the pulse signal of a predetermined frequency in the same manner as the triangular wave oscillator 33b of the first embodiment. Further, in the same manner as the PWM comparator 32 of the first embodiment, the FF circuit 74 is configured so that the supply of power supply voltage to the elements configuring the FF circuit 74 are controlled by the mode control signal SM.

The operation of the DC-DC converter 70 will now be described.

The input voltage Vin supplied from the battery 11 shown in FIG. 4 is lowered through use of the electronic device 10 or through discharge. The mode control circuit 35 of DC-DC converter 70 generates the mode control signal SM of an H level when the output voltage of the voltage amplifier 72 is higher than the reference voltage Vr2. Further, the mode control circuit 35 generates the mode control signal SM of an L level when the output voltage of the voltage amplifier 72 is lower than the reference voltage Vr2.

[When Mode Control Signal SM is an H Level]

The oscillator 75 oscillates and operates in response to the mode control signal SM of an H level and generates the pulse-shaped signal SP. The FF circuit 74 operates in response to the mode control signal SM of an H level. The switch SW1 connects the common terminal Tc to the first switching terminal Ta in response to the mode control signal SM of an H level. The AND circuit 34 generates the control signal DL, which has the same phase as the output signal QL of the FF circuit 74 in response to the mode control signal SM of an H level.

Therefore, the controller 71 turns ON the output transistor T1 at a constant period in response to the rise of the output signal of the oscillator 75. When the output transistor T1 is turned ON, the current IL flowing through the choke coil L1 and the current detection resistor Rs increases. This increases the output voltage of the voltage amplifier 72. The signal of an H level is output to the reset terminal R of the FF circuit 74 when the output voltage of the voltage amplifier 72 becomes higher than the voltage of the first error signal S1a from the error amplifier 31. This turns OFF the output transistor T1 and turns ON the output transistor T2, thereby releasing the energy stored in the choke coil L1 through the output transistor T2.

When the output voltage Vout becomes low during the activation and inactivation of the output transistors T1 and T2, the voltage of the first error signal S1a from the error amplifier 31 becomes high, and the time for setting the output signal of the comparator 73 to an H level is prolonged. Thus, the activated time of the output transistor T1 becomes relatively long, and the potential of the output voltage Vout is raised. If, on the other hand, the output voltage Vout becomes high, the voltage of the first error signal S1a from the error amplifier 31 becomes low, and the time for setting the output signal of the comparator 73 to an H level is shortened. Thus, the activated time of the output transistor T1 becomes relatively short, and the potential of the output voltage Vout is lowered. Through such an operation, the output transistor T1 is turned ON in a constant cycle based on the output signal frequency of the oscillator 75, and the timing at which the output transistor T1 is turned OFF is determined based on the increase in the output current IL. The timing changes in accordance with the level of the output voltage Vout, and the output voltage Vout is kept constant.

[When mode Control Signal SM is L Level]

The oscillator 75 and the FF circuit 74 stops operating in response to the mode control signal SM of an L level. The switch SW1 connects the common terminal Tc to the second terminal Tb in response to the mode control signal SM of an L level. The AND circuit generates the control signal DL of an L level in response to the mode control signal SM of an L level.

Therefore, the controller 71 turns OFF the output transistor and controls the ON-resistance value of the output transistor T1 based on the second error signal S1b. That is, the DC-DC converter 70 operates as the linear regulator and maintains the output voltage Vout at a constant voltage that is based on the reference voltage Vr1. Since the linear regulator does not involve a switching operation, ripple voltage of the output voltage Vout is suppressed to an extremely low level. Further, in the error amplifier 31, the voltage amplifier 72 of the DC-DC converter 70 stops operating. Since the power consumption in the FF circuit 74 and the oscillator 75 is a fixed loss of the DC-DC converter 70, the fixed loss in the controller 71 of the DC-DC converter 70 is reduced.

The DC-DC converter 70 of the third embodiment has the advantages described below.

The DC-DC converter 70, which is a current controlling mode DC-DC converter, detects the current IL flowing through the current detection resistor Rs and keeps the output voltage Vout constant. In the current controlling mode DC-DC converter 70, the controller 71 determines the operation mode in accordance with the output current IL and operates the switching regulator or the linear regulator in accordance with the determined operation mode. Therefore, high conversion efficiency is obtained, and an increase in area is suppressed.

It should be apparent to those skilled in the art that the present invention may be embodied in many other specific forms without departing from the spirit or scope of the invention. Particularly, it should be understood that the present invention may be embodied in the following forms.

In the first embodiment and the second embodiment, the pulse-shaped signal SP is provided to the FF circuit 42 of the mode control circuit 35. However, the signal provided to the FF circuit 42 is not limited to the pulse shape as long as the FF circuit 42 is capable of latching or holding the signal. For instance, the signal SS having a triangular shape and generated in the FF circuit 42 may be provided to the FF circuit 42.

Figure 8:
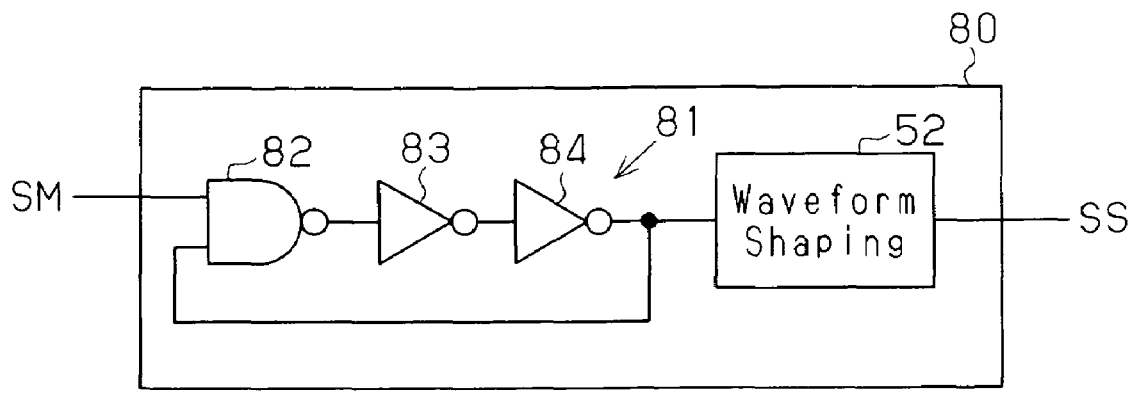
FIG. 8 is schematic circuit diagram of a triangular wave oscillator according to a further embodiment of the present invention.

In the first embodiment, the power consumption is reduced by including the switch SW2, the activation and inactivation of which is controlled by the mode control signal SM, in the triangular wave oscillator 33b, and controlling the supply of the power supply voltage Vcc to the ring oscillator 51 and the waveform shaping circuit 52 with the switching SW2. However, power consumption may be reduced through other configurations. For instance, as shown in FIG. 8, the ring oscillator 81 includes one NAND circuit 82 and an even number of (two in the figure) inverter circuits 83 and 84 connected in a ring, and the mode control signal SM may be provided to the NAND circuit 82. The triangular wave oscillator 80 oscillates and operates in response to the mode control signal SM of an H level. Further, the triangular wave oscillator 80 does not oscillate and operate when the mode control signal SM has an L level. Therefore, the triangular wave oscillator 80 consumes static power during the linear operation mode and does not consume dynamic power involved in oscillation. This reduces power consumption.

The DC-DC converter 70 of the third embodiment may include the mode control circuit 35a of the second embodiment.

In each of the above embodiments, the error amplifier 31 for generating complementary error signals S1a, S1b is used. This is because the change in the first error signal S1a and the output signal of the PWM comparator 32 varies in the first and the second embodiments, and the change in the first error signal S1a and the output signal of the FF circuit 74 varies in the third embodiment, and the first error signal S1a cannot be directly provided to the output transistor T1. Therefore, the error amplifier may output only one error signal from an output terminal may when using a circuit that inverts the first error signal S1a as the reference voltage Vr1 or when the PWM comparator 32 and the FF circuit 74 output a signal that changes in the same direction as the first error signal S1.

In each of the above embodiments, the AND circuit 34 is used as the signal control circuit. However, a signal may be controlled based on the mode control signal through other configurations.

In each of the above embodiments, the present invention is embodied in the step-down DC-DC converters 12, 12a, 70, which generate the voltage Vout by lowering the input voltage Vin. However, the voltage Vout may be changed when necessary. That is, the DC-DC converter does not have to be a step-down or step-up type converter, and the present invention may be embodied in a DC-DC converter for generating negative voltage or a DC-DC converter for generating a plurality of different voltages in accordance with the configuration of the semiconductor circuit that supplies the output voltage Vout.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A DC-DC converter for generating output voltage from input voltage, the DC-DC converter comprising:
    a first output transistor;
    a second output transistor electrically connected in series to the first output transistor;
    a choke coil electrically connected to a node between the first output transistor and the second output transistor with at least either one of the first output transistor and the second output transistor being operated to generate the output voltage of the DC-DC converter based on the input voltage;
    a smoothing capacitor, electrically connected to the choke coil, for smoothing the output voltage of the DC-DC converter; and
    a controller, electrically connected to the first output transistor and the second output transistor, for controlling the first output transistor and the second output transistor in a first operation mode or a second operation mode based on the output voltage of the DC-DC converter or output current, in which the output current changes in accordance with the output voltage,
    wherein the controller includes an error amplifier which generates a first error signal based on a differential voltage between the output voltage and a first reference voltage and a second error signal that is complementary to the first error signal, and
    wherein the controller activates and inactivates the first output transistor and the second output transistor in a complementary manner by a control signal in accordance with the first error signal during the first operation mode, and the controller inactivates the second output transistor and performs linear operation with the first output transistor by the second error signal during the second operation mode.

2. The DC-DC converter according to claim 1, further comprising:
    a mode control circuit for comparing the output voltage with a second reference voltage and generating a mode control signal, indicating the first operation mode when the output voltage is greater than the second reference voltage and indicating the second operation mode when the output voltage is less than the second reference voltage, wherein the controller controls the first output transistor and the second output transistor in the first operation mode or the second operation mode in accordance with the mode control signal.

3. The DC-DC converter according to claim 2, wherein the controller includes:
    the error amplifier for comparing the output voltage with the first reference voltage and generating as the first error signal and the second error signal in accordance with the comparison;
    a triangular wave oscillator for generating a triangular wave signal;
    a PWM comparator, connected to the error amplifier and the triangular wave oscillator, for comparing the first error signal and the triangular wave signal and generating a control signal in accordance with the comparison;
    a selection circuit, connected to the mode control circuit, the error amplifier, the PWM comparator, and the first output transistor, for providing, in accordance with the mode control signal, the first output transistor with the control signal during the first operation mode and the first output transistor with the second error signal during the second operation mode; and
    a signal control circuit, connected to the mode control circuit, the PWM comparator, and the second output transistor, for providing, in accordance with the mode control signal, the second output transistor with the control signal during the first operation mode and generating a signal for inactivating the second output transistor during the second operation mode.

4. The DC-DC converter according to claim 3, wherein at least either one of the triangular wave oscillator and the PWM comparator stops operating during the second operation mode in accordance with the mode control signal.

5. A DC-DC converter for generating output voltage from input voltage, the DC-DC converter comprising:
    a first output transistor;
    a second output transistor electrically connected in series to the first output transistor;
    a choke coil electrically connected to a node between the first output transistor and the second output transistor with at least either one of the first output transistor and the second output transistor being operated to generate the output voltage of the DC-DC converter based on the input voltage;
    a smoothing capacitor, electrically connected to the choke coil, for smoothing the output voltage of the DC-DC converter; and
    a controller, electrically connected to the first output transistor and the second output transistor, for controlling the first output transistor and the second output transistor in a first operation mode, a second operation mode, or a third operation mode based on the output voltage of the DC-DC converter or output current, in which the output current changes in accordance with the output voltage, wherein the controller activates and inactivates the first output transistor and the second output transistor in a complementary manner during the first operation mode, the controller inactivates the second output transistor and activates and inactivates the first output transistor during the second operation mode, and the controller inactivates the second output transistor and performs linear operation with the first output transistor during the third operation mode,
    wherein the controller includes an error amplifier which generates a first error signal based on a differential voltage between the output voltage and a first reference voltage and a second error signal that is complementary to the first error signal, and wherein the controller activates and inactivates the first output transistor and the second output transistor in a complementary manner by a control signal in accordance with the first error signal during the first operation mode, the controller inactivates the second output transistor and activates and inactivates the first output transistor by the control signal during the second operation mode, and the controller inactivates the second output transistor and performs linear operation with the first output transistor by the second error signal during the third operation mode.

6. The DC-DC converter according to claim 5, further comprising:

a mode control circuit for comparing the output voltage with a third reference voltage and a fourth reference voltage that differ from each other and generating a mode control signal indicating the first operation mode when the output voltage is greater than the third reference voltage and the fourth reference voltage, the second operation mode when the output voltage is less than the third reference voltage but greater than the fourth reference voltage, and the third operation mode when the output voltage is less than the third reference voltage and the fourth reference voltage, wherein the controller controls the first output transistor and the second output transistor in the first operation mode, the second operation mode, or the third operation mode in accordance with the mode control signal.

7. The DC-DC converter according to claim 6, wherein the controller includes:

the error amplifier for comparing the output voltage with the first reference voltage and generating as the first error signal and the second error signal in accordance with the comparison;

a triangular wave oscillator for generating a triangular wave signal;

a PWM comparator, connected to the error amplifier and the triangular wave oscillator, for comparing the first error signal with the triangular wave signal and generating a control signal in accordance with the comparison;

a selection circuit, connected to the mode control circuit, the error amplifier, the PWM comparator, and the first output transistor, for providing, in accordance with the mode control signal, the first output transistor with the control signal during the first operation mode and the second operation mode and the first output transistor with the second error signal during the third operation mode; and a signal control circuit, connected to the mode control circuit, the PWM comparator, and the second output transistor, for providing, in accordance with the mode control signal, the second output transistor with the control signal during the first operation mode and generating a signal for inactivating the second output transistor during the second operation mode and the third operation mode.

8. The DC-DC converter according to claim 7, wherein at least either one of the triangular wave oscillator and the PWM comparator stops operating during the third operation mode in accordance with the mode control signal.

9. A controller for a DC-DC converter including a first output transistor, a second output transistor electrically connected in series to the first output transistor, a choke coil electrically connected to a node between the first output transistor and the second output transistor with at least either one of the first output transistor and the second output transistor being operated to generate output voltage of the DC-DC converter based on input voltage, and a smoothing capacitor, electrically connected to the choke coil, for smoothing the output voltage of the DC-DC converter, wherein the controller comprising:

a circuit for controlling the first output transistor and the second output transistor in a first operation mode or a second operation mode based on the output voltage of the DC-DC converter or output current, in which the output current changes in accordance with the output voltage, wherein the circuit includes an error amplifier which generates a first error signal based on a differential voltage between the output voltage and a first reference voltage and a second error signal that is complementary to the first error signal, the circuit activating and inactivating the first output transistor and the second output transistor in a complementary manner by a control signal in accordance with the first error signal during the first operation mode, and inactivating the second output transistor and performing linear operation with the first output transistor by the second error signal during the second operation mode.

10. The controller according to claim 9, wherein the circuit includes:

a mode control circuit for comparing the output voltage with a second reference voltage and generating a mode control signal, indicating the first operation mode when the output voltage is greater than the second reference voltage and indicating the second operation mode when the output voltage is less than the second reference voltage, wherein the controller controls the first output transistor and the second output transistor in the first operation mode or the second operation mode in accordance with the mode control signal.

11. The controller according to claim 10, wherein the circuit includes:

the error amplifier for comparing the output voltage with the first reference voltage and generating the first error signal and the second error signal in accordance with the comparison;

a triangular wave oscillator for generating a triangular wave signal;

a PWM comparator, connected to the error amplifier and the triangular wave oscillator, for comparing the first error signal and the triangular wave signal and generating a control signal in accordance with the comparison;

a selection circuit, connected to the mode control circuit, the error amplifier, the PWM comparator, and the first output transistor, for providing, in accordance with the mode control signal, the first output transistor with the control signal during the first operation mode and the first output transistor with the second error signal during the second operation mode; and a signal control circuit, connected to the mode control circuit, the PWM comparator, and the second output transistor, for providing, in accordance with the mode control signal, the second output transistor with the control signal during the first operation mode and generating a signal for inactivating the second output transistor during the second operation mode.

12. The controller according to claim 11, wherein at least either one of the triangular wave oscillator and the PWM comparator stops operating during the second operation mode in accordance with the mode control signal.

13. A controller for a DC-DC converter including a first output transistor, a second output transistor electrically connected in series to the first output transistor, a choke coil electrically connected to a node between the first output transistor and the second output transistor with at least either one of the first output transistor and the second output transistor being operated to generate output voltage of the DC-DC converter based on input voltage, a smoothing capacitor, electrically connected to the choke coil, for smoothing the output voltage of the DC-DC converter, wherein the controller comprising:
- a circuit for controlling the first output transistor and the second output transistor in a first operation mode, a second operation mode, or a third operation mode based on the output voltage of the DC-DC converter or output current, in which the output current changes in accordance with the output voltage,
- wherein the circuit includes an error amplifier which generates a first error signal based on a differential voltage between the output voltage and a first reference voltage and a second error signal that is complementary to the first error signal, the circuit activating and inactivating the first output transistor and the second output transistor in a complementary manner by a control signal in accordance with the first error signal during the first operation mode, inactivating the second output transistor and activating and inactivating the first output transistor by the control signal during the second operation mode, and inactivating the second output transistor and performing linear operation with the first output transistor by the second error signal during the third operation mode.

14. The controller according to claim 13, wherein the circuit includes:
- a mode control circuit for comparing the output voltage with a third reference voltage and a fourth reference voltage that differ from each other and generating a mode control signal indicating the first operation mode when the output voltage is greater than the third reference voltage and the fourth reference voltage, the second operation mode when the output voltage is less than the third reference voltage but greater than the fourth reference voltage, and the third operation mode when the output voltage is less than the third reference voltage and the fourth reference voltage, wherein the controller controls the first output transistor and the second output transistor in the first operation mode, the second operation mode, or the third operation mode in accordance with the mode control signal.

15. The controller according to claim 14, wherein the circuit includes:
- the error amplifier for comparing the output voltage with the first reference voltage and generating the first error signal and the second error signal in accordance with the comparison;
- a triangular wave oscillator for generating a triangular wave signal;
- a PWM comparator, connected to the error amplifier and the triangular wave oscillator, for comparing the first error signal with the triangular wave signal and generating the control signal in accordance with the comparison;
- a selection circuit, connected to the mode control circuit, the error amplifier, the PWM comparator, and the first output transistor, for providing, in accordance with the mode control signal, the first output transistor with the control signal during the first operation mode and the second operation mode and the first output transistor with the second error signal during the third operation mode; and
- a signal control circuit, connected to the mode control circuit, the PWM comparator, and the second output transistor, for providing, in accordance with the mode control signal, the second output transistor with the control signal during the first operation mode and generating a signal for inactivating the second output transistor during the second operation mode and the third operation mode.

16. The controller according to claim 15, wherein at least either one of the triangular wave oscillator and the PWM comparator stops operating during the third operation mode in accordance with the mode control signal.

17. A method for controlling a DC-DC converter for generating output voltage from input voltage, the DC-DC converter including a first output transistor, a second output transistor electrically connected in series to the first output transistor, a choke coil electrically connected to a node between the first output transistor and the second output transistor with at least either one of the first output transistor and the second output transistor being operated to generate the output voltage of the DC-DC converter based on the input voltage, and a smoothing capacitor, electrically connected to the choke coil, for smoothing the output voltage of the DC-DC converter, the method comprising:
- detecting the output voltage of the DC-DC converter or output current, in which the output current changes in accordance with the output voltage;
- controlling the first output transistor and the second output transistor in a first operation mode or a second operation mode based on the detected output voltage or the output current; said controlling including:
  - activating and inactivating the first output transistor and the second output transistor in a complementary manner by a control signal in accordance with a first error signal during the first operation mode, wherein the first error signal is generated based on a differential voltage between the output voltage and a first reference voltage; and
  - inactivating the second output transistor and performing linear operation with the first output transistor by a second error signal during the second operation mode, wherein the second error signal is generated complementary to the first error signal.

18. The method according to claim 17, further comprising:
- comparing the output voltage with a second reference voltage and generating a mode control signal, indicating the first operation mode when the output voltage is greater than the second reference voltage and indicating the second operation mode when the output voltage is less than the second reference voltage, wherein said controlling includes controlling the first output transistor and the second transistor in the first operation mode or the second operation mode in accordance with the mode control signal.

19. A method for controlling a DC-DC converter for generating output voltage from input voltage, the DC-DC converter including a first output transistor, a second output transistor electrically connected in series to the first output transistor, a choke coil electrically connected to a node between the first output transistor and the second output transistor with at least either one of the first output transistor and the second output transistor being operated to generate the output voltage of the DC-DC converter based on the input voltage, a smoothing capacitor, electrically connected to the choke coil, for smoothing the output voltage of the DC-DC converter, the method comprising:

detecting the output voltage of the DC-DC converter or output current, in which the output current changes in accordance with the output voltage;

controlling the first output transistor and the second output transistor in a first operation mode, a second operation mode, or a third operation mode based on the detected output voltage or the output current; said controlling including:

activating and inactivating the first output transistor and the second output transistor in a complementary manner by a control signal in accordance with a first error signal during the first operation mode, wherein the first error signal is generated based on a differential voltage between the output voltage and a first reference voltage;

inactivating the second output transistor and activating and inactivating the first output transistor by the control signal during the second operation mode; and inactivating the second output transistor and performing linear operation with the first output transistor by a second error signal during the third operation mode, wherein second error signal is generated complementary to the first error signal.

20. The method according to claim 19, further comprising:

comparing the output voltage with a third reference voltage and a fourth reference voltage that differ from each other and generating a mode control signal indicating the first operation mode when the output voltage is greater than the third reference voltage and the fourth reference voltage, the second operation mode when the output voltage is less than the third reference voltage but greater than the fourth reference voltage, and the third operation mode when the output voltage is less than the third reference voltage and the fourth reference voltage, wherein said controlling includes controlling the first output transistor and the second output transistor in the first operation mode, the second operation mode, or the third operation mode in accordance with the mode control signal.

\* \* \* \* \*